May 31, 1927.
W. W. BLAKELY ET AL
1,630,519
BRAKE ROD HEAD
Filed June 11, 1923
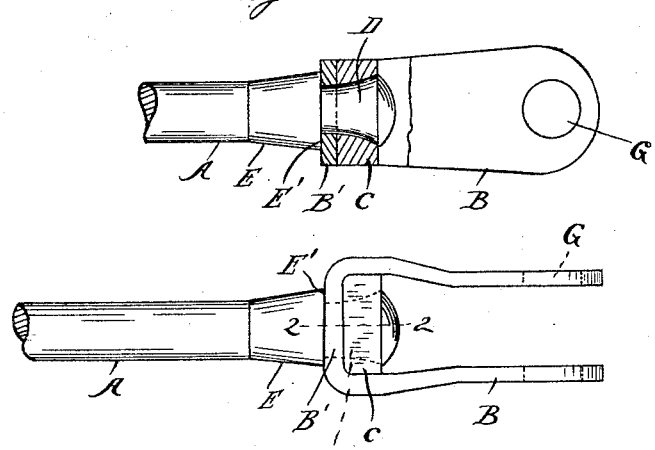

Patented May 31, 1927.

1,630,519

UNITED STATES PATENT OFFICE.

WILLIAM W. BLAKELY, OF DETROIT, AND CHARLES A. GOODSPEED, OF HIGHLAND PARK, MICHIGAN; SAID GOODSPEED ASSIGNOR TO SAID BLAKELY.

BRAKE-ROD HEAD.

Application filed June 11, 1923. Serial No. 644,697.

This invention relates to brake rod heads and more particularly relates to a novel means for securely mounting a sheet metal head upon a brake rod.

The invention consists in the structural features and arrangement of parts hereinafter described.

In the drawings:—

Figure 1 is a top view of a brake rod extremity upon which a head is mounted in accordance with the invention;

Figure 2 is a side view of the same, partly in section on line 2—2 of Figure 1.

In these views, the reference character A designates the brake rod and B a U-shaped sheet metal head terminally carried by said rod for establishing a connection to a part, not shown. In using sheet metal for this purpose a difficulty is encountered in that the yoke portion B′ of the head lacks the thickness requisite to establishment of a strong rigid joint between the head and rod. In the present invention this difficulty is overcome by fitting a metal block C, preferably of steel, snugly between the parallel arms of the head B in contact with the yoke portion thereof, registering openings being formed centrally in said block and yoke portion for engagement by a reduced end portion D of the rod A, said openings flaring toward the exposed face of said block. The reduced end portion D is upset by any suitable means so as to provide a tapered portion which completely fills the flaring openings in the block and yoke portion and also overlaps to some extent the exposed apertured face of said block. Thus, the block C is securely held in position between the arms of the head and against the yoke portion thereof, while the head is firmly attached to the rod A. The yoke portion of the head seats upon an annular shoulder E′ adjacent the reduced end portion D, said shoulder being at the larger diameter end of a gradually tapered enlargement E of the rod A extending a short distance from said head.

Since the block C fits snugly and rigidly between the arms of the head B, said block has the effect of an integral portion of said head in restraining the latter from rotation. By the use of said block, the bearing surface of the head engaged by the upset tapered end portion D of the rod is very considerably increased over that which is provided by the yoke B′ alone, so that the rigidity and strength of the connection is largely increased by the employment of said reinforcing block. Any thrust transmitted from the rod A to the head B (or vice versa) is adequately taken care of by the annular shoulder E′ against which the head seats. Preferably, the free ends of the arms of the head are formed with registering openings G for use in establishing a connection to the part which said head engages.

What we claim as our invention is:—

1. The combination with a rod and a U-shaped sheet metal head terminally carried thereby, of a reinforcing block sleeved upon the rod between the arms of said head and abutting the closed end thereof, said rod having an upset portion bearing against the block and holding the block against the head aforesaid.

2. The combination with a U-shaped sheet metal head, of a block inserted between and bearing against the arms of said head and likewise bearing against the closed end of the head, said end and block having a registering opening, of a rod having a shoulder forming a seat for said head and having a tapering portion beyond said shoulder engaging in the registered openings of said head and block retaining the block in the head and retaining the head on the rod.

3. The combination with a U-shaped sheet metal head, of a block mounted within said head against the closed end thereof, said end and block having a registering opening flaring toward the exposed face of said block, and a rod having an end portion engaging in said opening and upset to fill the same whereby the block is rigidly held in the described relation to the head and the latter is rigidly secured upon the rod.

4. The combination with a sheet metal head having transverse portions, one of which is formed with an opening, of a block fitting in the angle between said transverse portions and having an opening registering with that of said head, and a rod having a shoulder forming a seat for said head and having an upset end portion engaging in the registering openings of said head and block rigidly connecting the block to the head and the head to the rod.

5. A brake rod head comprising a rod having adjoining outer and inner tapered portions, a head sleeved on the outer tapered portion, and a block also sleeved on the outer tapered portion and holding the head against the inner tapered portion.

6. A brake rod head comprising a rod having a shoulder intermediate the ends thereof and an upset portion at one end, a substantially U-shaped head having the base thereof sleeved on the rod between the upset portion and shoulder, and a block sleeved upon the rod between the base of the head and the upset portion of the rod.

7. In combination, a rod having longitudinally spaced shoulders, a substantially U-shaped head having the base thereof sleeved on the rod between said shoulders, and a block sleeved on the rod between the base of the head and one of said shoulders.

8. In combination, a substantially U-shaped head having an aperture in the base thereof, a block between the arms of the U-shaped head having an aperture in alignment with the aperture in the base, and a rod extending through said aligned apertures having a shoulder engaging the base of the head and a second shoulder engaging the block.

9. In combination, a rod having a flaring end portion, a head sleeved upon said flaring end portion, a shoulder on the rod constituting an abutment for said head, and a second abutment member for the head held on the rod by the flaring portion aforesaid.

In testimony whereof we affix our signatures.

WILLIAM W. BLAKELY.
CHARLES A. GOODSPEED.